(12) United States Patent
Schäfer et al.

(10) Patent No.: US 11,552,522 B2
(45) Date of Patent: Jan. 10, 2023

(54) ROTOR WITH A BEARING

(71) Applicant: MINEBEA MITSUMI Inc., Nagano (JP)

(72) Inventors: Uwe Schäfer, Rottweil (DE); Helmut Schneider, Zimmern-Flözlingen (DE); Felix Blaser, Villingen-Schwenningen (DE)

(73) Assignee: MINEBEA MITSUMI Inc., Nagano (JP)

( * ) Notice: Subject to any disclaimer, the term of this patent is extended or adjusted under 35 U.S.C. 154(b) by 362 days.

(21) Appl. No.: 17/060,747

(22) Filed: Oct. 1, 2020

(65) Prior Publication Data

US 2021/0104931 A1 Apr. 8, 2021

(30) Foreign Application Priority Data

Oct. 2, 2019 (DE) .......................... 102019126660.2

(51) Int. Cl.
*H02K 5/16* (2006.01)
*H02K 5/167* (2006.01)
*H02K 7/08* (2006.01)

(52) U.S. Cl.
CPC ........... *H02K 5/1672* (2013.01); *H02K 7/083* (2013.01)

(58) Field of Classification Search
CPC .............................. H02K 5/1672; H02K 7/083
USPC ............................................................ 310/90
See application file for complete search history.

(56) References Cited

U.S. PATENT DOCUMENTS

2003/0168925 A1    9/2003   Bemnreuther et al.

FOREIGN PATENT DOCUMENTS

DE            1932251 A1   1/1970
DE      102017103936 A1   8/2018

OTHER PUBLICATIONS

Gioistehn, Hans Heinrich: Lehr—und Übungsbuch der Technischen Mechanik. Band 2: Festigkeitslehre. Braunschweig : Vieweg, 1992. Titelblatt und Impressum und Inhaltsverzeichnis, 7 S.—ISBN 978-3-528-03043-8.

*Primary Examiner* — Terrance L Kenerly
(74) *Attorney, Agent, or Firm* — Budzyn IP Law, LLC

(57) ABSTRACT

A rotor for an electric motor, comprising a rotor magnet and a bearing for the rotatable support on a fixed axle, the bearing comprising first and second bearing half-shells, wherein at least the first bearing half-shell is moveably arranged within the rotor body with respect to the second bearing half-shell, and wherein the first bearing half-shell is supported against the rotor body by a resilient element tangentially arranged with respect to the axle. The resilient element, at both its side surfaces facing in an axial direction of the axle, has at least one respective first protrusion extending in the axial direction, and the first bearing half-shell, on a side facing away from its bearing surface, includes at least two axially spaced second protrusions each extending in a radial direction and cooperating with the first protrusions for aligning the resilient element.

41 Claims, 8 Drawing Sheets

A–A

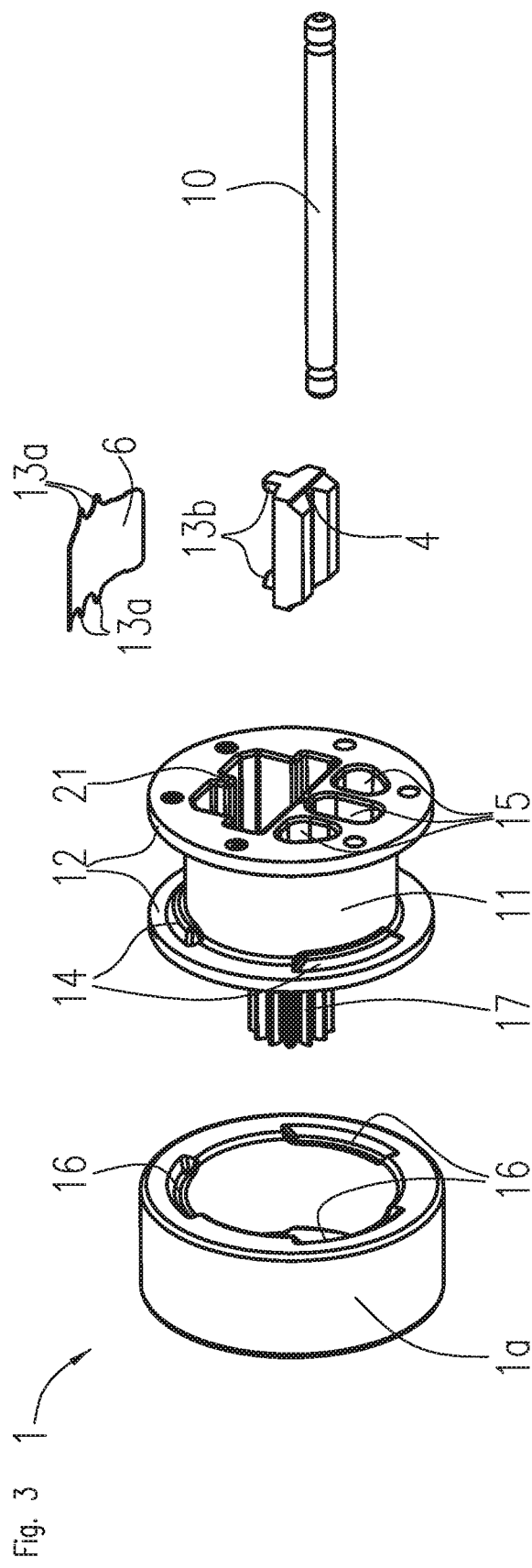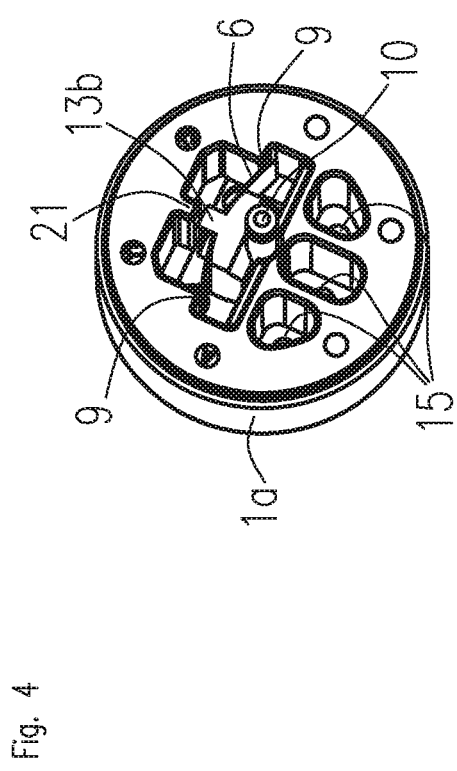

ROTOR WITH A BEARING

FIELD OF THE INVENTION

The invention relates to a rotor for an electric motor, comprising a rotor body including a bearing for the rotatable support on a fixed axle, the bearing comprising a first and a second bearing half-shell, wherein at least the first bearing half-shell is movably arranged within the rotor body with respect to the second bearing half-shell.

BACKGROUND OF THE INVENTION

Rotors with bearings are used in electric motors, in particular in brushless DC motors, for example in fans or actuating systems, for example in automotive, industrial or domestic applications. Herein, it is customary to use rotors which rotate about a fixed axle and include a respective bearing for this purpose. These bearings are mostly formed as radial plain bearings. To run with as little friction as possible, a radial gap is needed between the bearing and the axle. This enables, however, a radial movement of the rotor body, which can lead to undesirable noise.

DE 19 32 251 A1 discloses a fixed bearing housing in which to a rotating shaft has a radial force applied to it by means of an elastic element and is thus biased. This type of bearing cannot be used, however, in rotating systems, since high mass forces due to high moments of inertia have to be supported at high motor speeds. The bearing pressure required for a backlash-free bearing cannot be sustained at high speeds.

DE 10 2017 103 936 A1 further discloses a rotor with a resilient element for supporting the rotor on the rotor axle. The arrangement disclosed there comprises a resilient element which is weakened by recesses in the region of its greatest bending. In other embodiments, the stiffness is substantially increased in this region. In all embodiments the spring action is unevenly distributed over the geometry of the resilient element. Furthermore, metal fatigue can arise early, for example in the region of the recesses.

It is therefore an object of the present invention to provide a rotor with a backlash-free bearing for the rotatable support of the rotor, which can maintain a high bearing pressure even at high speeds.

SUMMARY OF THE INVENTION

The object is achieved by the invention indicated in the independent claims. Advantageous embodiments can be derived from the dependent claims.

According to the present invention, a rotor is provided which consists of a rotor body which in turn carries a rotor magnet, and a bearing at the center. The rotor magnet can suitably consist of an annular permanent-magnetic body having alternately magnetized poles in the circumferential direction. The rotor body is arranged in a stator having, for example, nine stator poles. These stator poles have the stator windings wound round them.

According to the present invention, a rotor of the initially defined type is provided, wherein the first bearing half-shell is supported by a resilient element against the rotor body tangentially arranged with respect to the axle. By tangentially arranging the resilient element with respect to the axle, radially extending spring elements can be dispensed with. By these means, the moment of inertia of the rotor is reduced. Thus, uneven mass distributions have less of an impact. Vibrations of the rotor arising due to influences or asymmetric mass distributions are therefore less pronounced. At the same time, the moment of inertia is reduced by a special geometry of the rotor magnet. Herein, cavities are formed in the rotor body which are separated by webs. These cavities can either be provided in the shape of through holes or are preferably limited at an end side of the rotor body by an axial side wall. By providing the cavities the rotor body becomes lighter and thus develops a lower moment of inertia. At the same time, protrusions are arranged opposite the cavities to avoid imbalance. The rotor body, at its annular outer edge, includes four hooks engaging with corresponding pockets of the rotor magnet. This is possible, for example, by providing that the rotor body is made of plastic material by means of injection molding on the rotor magnet or that the hooks of the rotor body are hot caulked and molded into the pockets of the rotor magnet to provide fixing with respect to the rotor body.

According to a first aspect of the invention, the resilient element, at both its side surfaces facing in an axial direction of the axle, has at least one respective first protrusion extending in the axial direction, and the first bearing half-shell, on a side facing away from its bearing surface, includes at least two axially spaced second protrusions each extending in a radial direction and cooperating with the first protrusions for aligning the resilient element.

Preferably, the resilient element, at both its side surfaces facing in the axial direction of the axle, has two respective first protrusions for aligning the resilient element.

According to a second aspect of the invention, the resilient element includes a near-axle central region and two decentral regions adjacent thereto, wherein the decentral regions have recesses symmetrically formed with respect to the central region.

The two aspects of the invention can be combined at will.

Preferably, the recesses flare out in their extension along the decentral regions starting from the central region. These recesses can be shaped, for example, in the shape of a trapeze, wherein a smaller base of the trapezoidal shape is adjacent to the central region. In principle, the shape of the recesses can be any particular shape. It is essential, however, that there is no or only little weakening of the resilient element in the central region. In this way, the resilient element is not weakened in the region which experiences the greatest bending during operation of the rotor. In the decentral region, however, the resilient element is weakened so that greater bending is enabled here. Overall, a linear behavior of the spring force along the displacement can be achieved by the recesses without weakening the resilient element in the region experiencing the strongest stress.

In some embodiments of the invention, it is further preferred for the resilient element to comprise edge regions adjacent to the decentral regions, wherein the edge regions have no recesses. In particular, the resilient element can be supported in the rotor body at its edge regions.

In some embodiments it is provided that the rotor body, at an inner circumference of a recess for receiving the resilient element, includes a protrusion extending in the axial direction. The protrusion is arranged opposite the resilient element and limits its maximum bending. In particular, it may be provided that the second protrusions of the first bearing half-shell cooperate with the protrusion of the rotor body to limit the maximum bending of the resilient element.

Preferably, the rotor body, at its axial ends, includes a respective attachment region, wherein the attachment regions have a larger circumference than an interposed retaining region. Therefore, the rotor magnet can be arranged at the retaining region and retained by the attachment regions. Furthermore, it can be provided, that hooks or protrusions are arranged or formed at the attachment regions, which engage with recesses or pockets of the rotor magnet. Therefore, in such embodiments, even better attachment of the rotor magnet can be achieved.

In some embodiments of the invention, the resilient element is a beam element and the first bearing half-shell is arranged on a longitudinal side of the beam element. Beam elements act as leaf springs and can provide high tension forces. At the same time, they are simple and cheap. By arranging the first bearing half-shell on a longitudinal side of the beam element it is achieved that the beam element contacts the bearing half-shell with a large part of its surface. Thereby a tension force required in operation can be transmitted with little pressure.

In an embodiment of the invention, side walls of the bearing half-shells in contact with the axle are formed to be interlocking with the, preferably hollow-cylindrical, axle to be supported. The axle is surrounded by the bearing shells and the rotor body is supported in an interlocking manner. The bearing pressure is uniformly distributed on an outer surface of the axle by the bearing half-shells. This reduces wear between the axle and the bearing half-shells. The side walls of the bearing half-shells can be additionally coated with a lubricant to reduce friction. Alternatively, the bearing half-shells themselves consist of a slippery material. Materials that can be considered in this context, are bronze compounds or plastic materials, the latter preferably being mixed with materials which further reduce bearing friction, such as for example polytetrafluoroethylene (PTFE, Teflon). Furthermore, solid lubricants such as molybdenum disulphide or graphite can be added to the bearing. Alternatively or additionally, bearing fluids such as oils or greases can be used as liquid lubricants.

In one embodiment of the invention, the rotor body comprises at least two supports for receiving the resilient element, and the resilient element is statically overdetermined within the rotor body. By means of a statically overdetermined support, a movement of the resilient element is enabled in the radial direction. The resilient element and the first bearing half-shell are thus decoupled from the rotor body. During assembly, the bearing half-shell is automatically centered by the pressure exerted by the resilient element. The resilient element can thus be easily inserted into the rotor body. This simplifies assembly.

In an embodiment of the invention, the supports of the resilient element are spaced apart from the plane defined by a rotor axle and an apex of the sidewall of the first bearing half-shell. The distance between the supports enables easy insertion of the resilient element into the rotor body during assembly.

In one embodiment of the invention, the resilient element, when it is excited by a rotary movement of the rotor body, is configured to form only higher-order eigenforms which result in a translatory displacement of the first bearing shell in relation to the axle. Due to vibrations of the rotor which are excited by rotary movements, the resilient element is also excited to vibrate. When the resilient element causes a vibration antinode in the region of the first bearing half-shell, these vibrations can lead to loosening of the first bearing half-shell from the axle to be retained in the radial direction despite pre-tensioning. As a consequence of the loosening, a greater radial backlash (an enlarged radial bearing gap) results, whereby the rotor is able to move in relation to the axle. This can lead to undesirable noise. The resilient element is thus configured and dimensioned in such a manner that it has a vibration behavior which avoids vibration antinodes in the region of the bearing half-shell. Advantageously, it has a vibration behavior which produces eigenforms when it is excited which cause the resilient element to deform in the region of the bearing half-shell in such a way that a rotary movement of the bearing half-shell results about the axle. This results in the side walls of the bearing half-shell remaining in contact with the axle and loosening being avoided. Undesirable radial movements of the rotor body are thus prevented. This results in less noise.

In one embodiment of the invention, the resilient element is of metal or plastic. For applications with rotors having a large diameter rotating at high speeds, metal has the advantage of high strength. Moreover, metal springs can provide large tensioning forces. For applications with rotors having small diameters that are manufactured in large numbers, plastic is advantageous since it is light and cheap to manufacture.

In one embodiment of the invention, the resilient element is integrally formed with the first bearing shell. The beam element and the first bearing half-shell form a one-piece component and can be made as an integral element. This lowers manufacturing cost. It is also possible to separately manufacture the resilient element, for example a leaf spring, and to also separately manufacture the first bearing half-shell. Both parts are then aligned or connected with each other by means of the first protrusions of the resilient element and the second protrusions of the first bearing half-shell.

In one embodiment of the invention the first bearing half-shell and/or the resilient element are of materials of a low specific weight. This further lowers the moment of inertia of the bearing and thus the rotor. The rotor is then less prone to vibration and can accelerate faster.

At an axial end of the rotor body a gear is additionally provided for driving further components.

In one embodiment of the invention the distance along a normal from a connecting line extending between the supports to the axle is smaller than an extension of the resilient element and/or the first bearing half-shell along the normal. In this embodiment the first bearing half-shell already pushes against the second bearing half-shell without an axle being inserted between the two bearing half-shells. The resilient element and/or the first bearing half-shell can thus be assembled in a prestressed manner.

According to a further aspect of the invention, an electric motor is provided, comprising a rotor according to claims 1 to 22. The rotors according to the present invention are particularly suitable for use in electric motors, preferably in brushless DC motors or stepping motors. In particular, such an electric motor can be part of an actuating drive having a reduction transmission for adjusting an actuator.

BRIEF DESCRIPTION OF THE DRAWINGS

Exemplary embodiments of the invention will be described in more detail in the following with reference to the accompanying drawings, wherein:

FIG. 3 shows an exploded view of the rotor of FIG. 2;

FIG. 4 shows a diagonal view of the rotor of FIG. 2;

DESCRIPTION OF THE EMBODIMENTS

Figure 1:
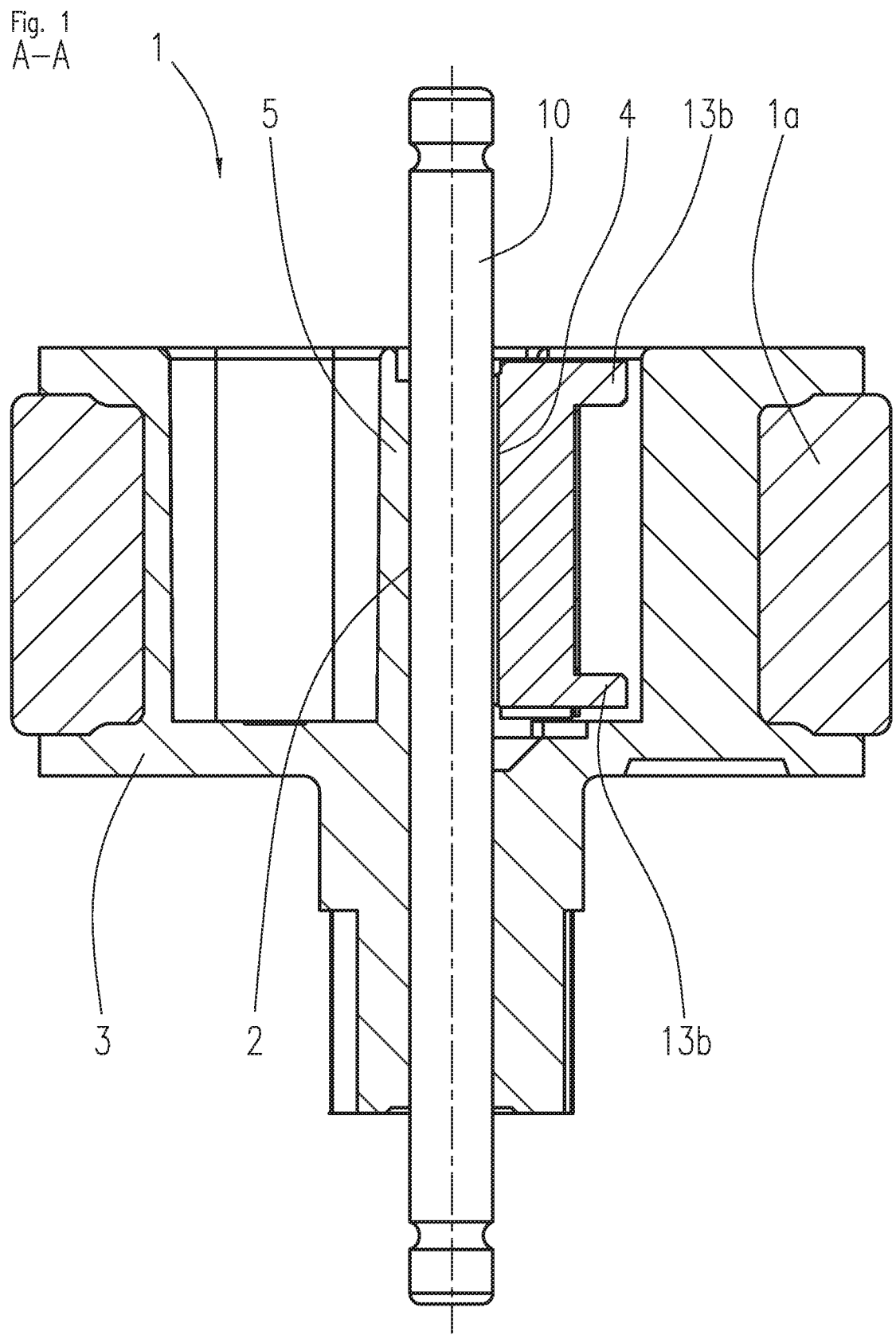
FIG. 1 shows a section A-A radially along the axle of an exemplary embodiment of a rotor according to the invention.

FIG. 1 shows a section A-A of a first exemplary embodiment of the rotor 1 according to the present invention comprising a rotor magnet 1a. The invention comprises a rotor body 3 with a bearing 2, wherein the rotor body 3 comprises a rotor magnet 1a. The rotor magnet 1a is a permanent-magnet ring. It is surrounded by a rotor body 3 which is mounted on the rotor magnet 1a, for example, by means of an injection molding method or a hot caulking method. The bearing 2 is arranged within the rotor body 3. Within the bearing 2, an axle 10 is arranged that is rotatably supported between a first bearing half-shell 4 and a second bearing shell 5, which can be seen in FIG. 2.

Figure 2:
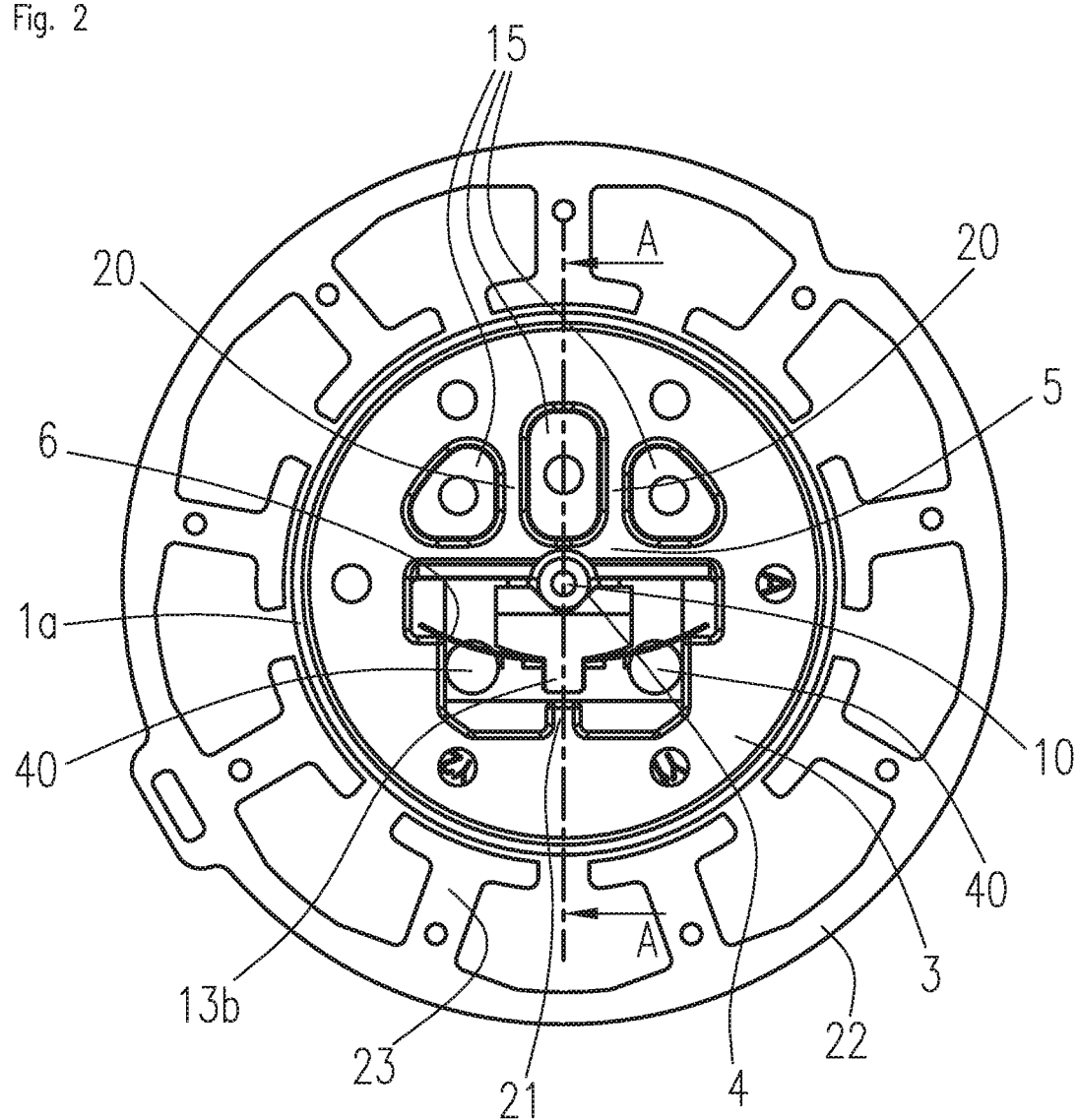
FIG. 2 shows a plan view of an exemplary rotor according to FIG. 1.

FIG. 2 shows a plan view of a rotor body 3 according to the present invention, which retains the rotor magnet 1a and which is integrally formed with the second bearing half-shell 5. The rotor body 3 is fixedly connected to the rotor magnet 1a. In the plan view, it can also be seen that the first bearing half-shell 4 cooperates with the resilient element 6 to rotatably support the rotor body 3. In alternative embodiments, the resilient element 6 can be integrally formed with the first bearing half-shell 4. The resilient element 6 is formed as a beam element 6 in the example. The resilient element 6 is tensioned across the supports 9 and thus presses the axle 10 against the second bearing shell 5 via the first bearing half-shell 4, thus rotatably supporting the axle 10. The rotor body 3 also includes three cavities 15. These cavities 15 are provided to reduce the weight of the rotor body 3, in turn reducing the moment of inertia. Between each of the cavities 15 there is a web 20. Additionally, the rotor body 3, at an inner circumference, includes a protrusion 21 which limits the maximum bending of the resilient element 6. The stator 22 with nine stator poles 23 is also schematically shown. The stator windings are not shown here for reasons of clarity.

Furthermore, FIG. 2 shows two through holes 40 of the rotor body 3. Together with a concentrically arranged third through hole through which the axle 10 extends, a total of three through holes are thus provided for the assembly of the resilient element 6, 6a, 6b. For assembly, it can now be provided that the rotor body 3 is fitted on three rods which are pushed through the three through holes. In a further step, the resilient element 6, 6a, 6b can then be arranged on the first bearing half-shell 4 and the two parts together can be fitted on the three rods. If the rotor body 3 is then withdrawn from the rods in the direction of the resilient element 6, 6a, 6b, it takes the resilient element 6, 6a, 6b with the first bearing half-shell 4 with it, thus positioning the two parts in the rotor body 3.

FIG. 3 shows a rotor according to the invention in an exploded view. The retaining region 12 of the rotor body 3 is easily discernible, about which the rotor magnet 1a is arranged. The rotor magnet 1a is retained by retaining regions 12 formed on the axial ends of the rotor body 3. For attachment, protrusions 14 are also formed at the attachment regions, which engage in pockets 16, in turn provided in the rotor magnets 1a. To do this, the rotor body 3 is injection molded, and thus mounted, by means of an injection molding method into the rotor magnets 1a.

Furthermore, the resilient element 6 is also shown here. The resilient element 6 has two protrusions at each side surface facing in the axial direction of the axle 10. FIG. 3 also shows a gear 17 which is mounted on one side of the rotor body 3. To do this, the axle 10 is pushed through the bearing 2 and the gear 17 is subsequently rotatably supported at the axle 10. Finally, the axle 10 is rotatably supported by means of the second bearing shell 5 and the first bearing shell 4, wherein the first bearing shell 4 is supported against the resilient element 6. Furthermore, the resilient element 6 is supported in the rotor body by means of two supports 9.

FIG. 4 shows a perspective view of a rotor according to the present invention, comprising a rotor body of FIG. 2. In this figure, the cavities 15 are especially clearly shown, as well as the protrusion 21 for limiting the maximum bending of the resilient element 6. The protrusion 21, the cavities 15 and the webs 20 are formed and configured with respect to each other, so that on the one hand the weight is kept low by the cavities 15 and on the other hand the center of mass is concentrically arranged so that there is no imbalance. By these means, the weight is kept low and thus also the arising moments of inertia are lower than in other rotatably supported rotor bodies.

Figure 5A:
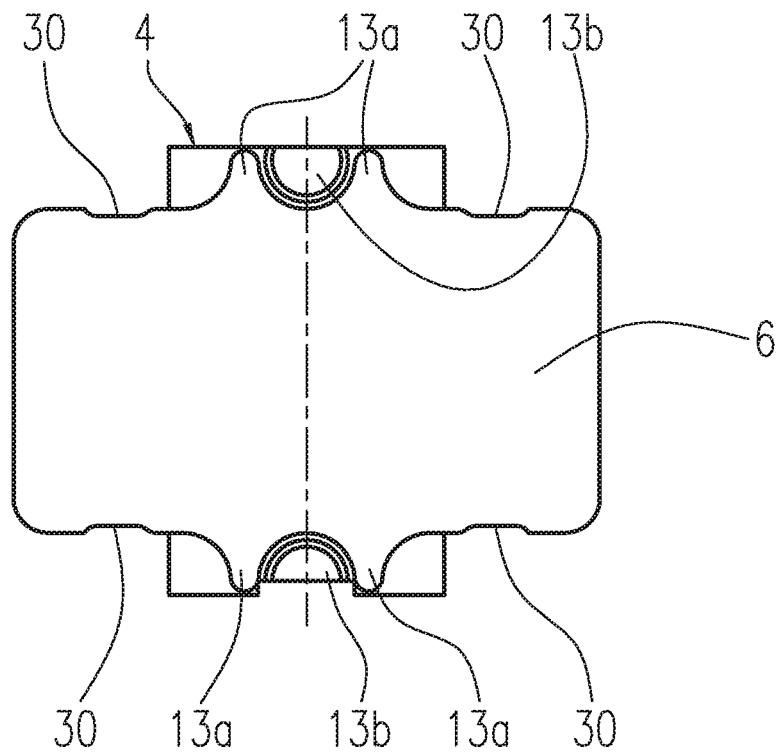
FIGS. 5*a* to 5*c* show different views of a resilient element and a first bearing half-shell of the rotor of FIGS. 1 to 4.
Figure 5B:
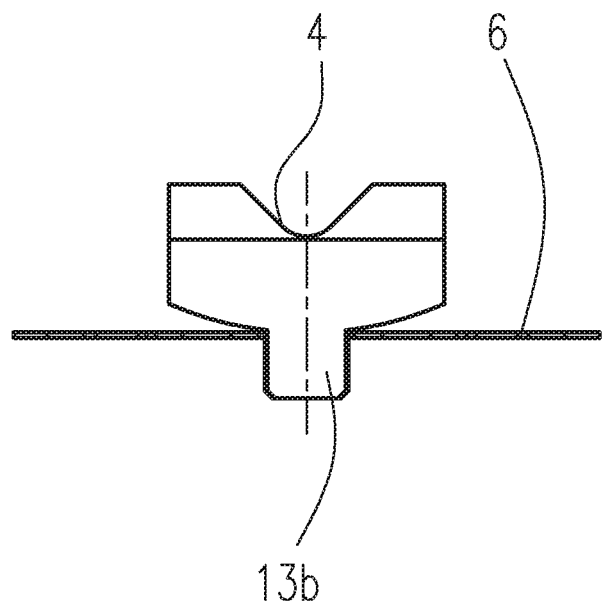
Figure 5C:
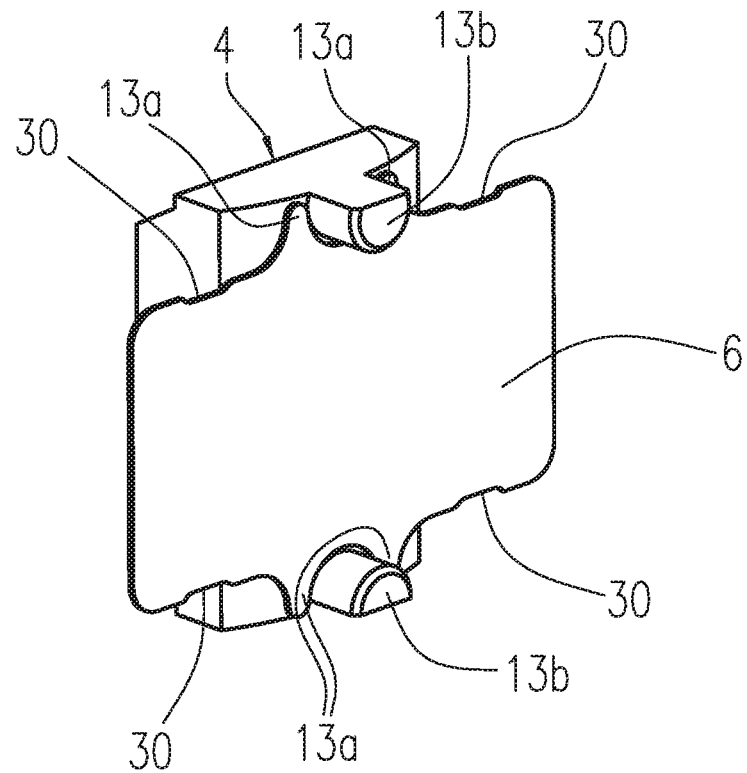

FIGS. 5a to 5c show various views of an embodiment of the resilient element 6 in detail. Furthermore, they show the side of the first bearing half-shell facing away from the bearing surface, and comprising axially spaced second protrusions 13b. The resilient element 6 is arranged at the back side of the first bearing half-shell 4 in such a manner that two respective first protrusions 13a of the resilient element 6 cooperate with one of the two second protrusions 13b of the bearing half-shell 4 and align and/or attach the two components to each other. This ensures that the two components can be easily assembled together within the rotor body. Opposite the two protrusions 13b, at an inner circumference of the rotor body, the protrusion 21 is formed for limiting the maximum bending of the resilient element 6. If the resilient element 6 now bends, the second protrusions 13b abut on the protrusion 21 so that the maximum bending of the resilient element 6 is limited. The resilient element 6, apart from the first protrusions 13a, is essentially formed in a rectangular shape.

In the example, the resilient element 6 is a stamped part, in particular a stamped spring steel sheet. In the example, furthermore, small recesses 30 can be seen formed at the end sides, next to the first protrusions. These are due to a configuration of the stamping process wherein, as a last step, the stamped piece is released from the sheet at these portions.

Figure 5D:
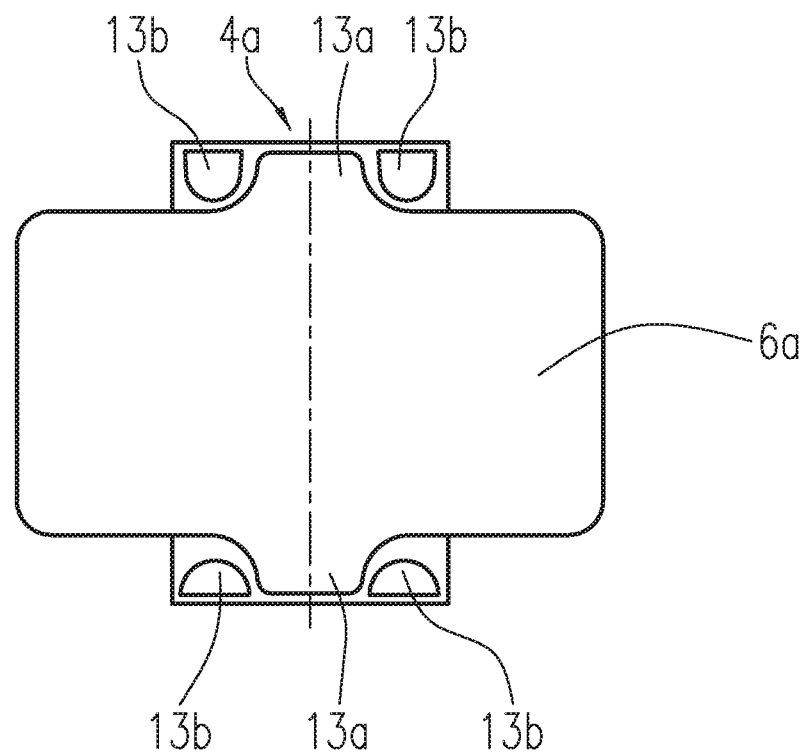
FIG. 5d shows an alternative embodiment of a resilient element and a bearing half-shell.

FIG. 5d shows an alternative embodiment of resilient element 6a and a bearing half-shell 4a. In this embodiment, the resilient element 6a has only one protrusion 13a at each of its two side surfaces facing in the axial direction. Each protrusion 13a now cooperates with two protrusions 13b of the bearing half-shell 4a for aligning and/or attaching the resilient element 6a. In a variation of this embodiment, more than two protrusions 13b can cooperate with each protrusion 13a of the resilient element 6a. Two respective protrusions 13b can also be combined to form one protrusion.

Figure 6A:
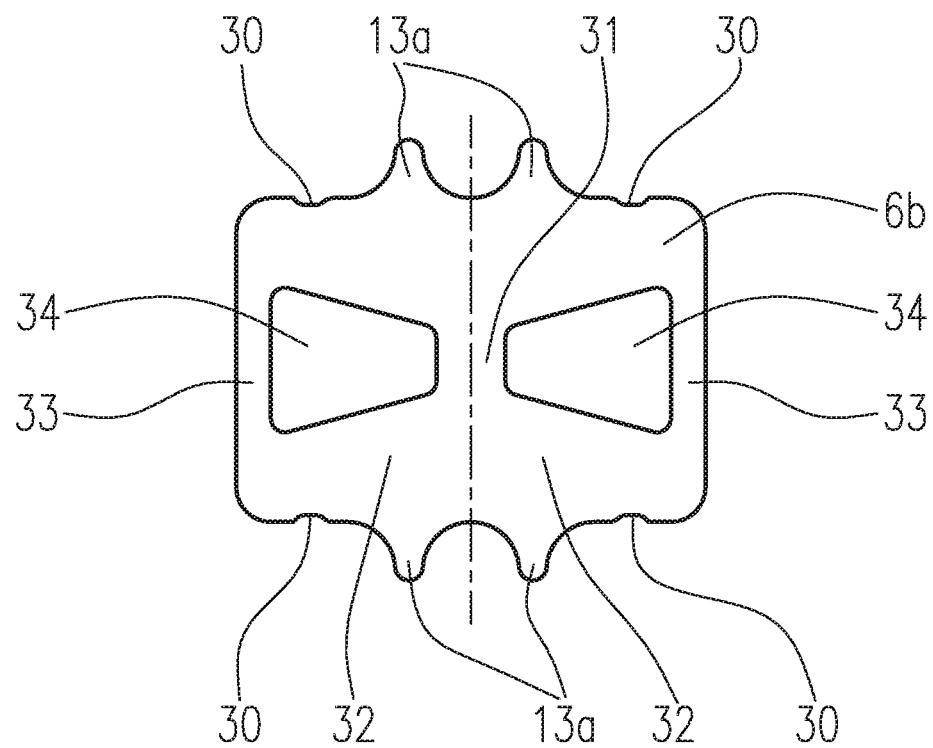
FIGS. 6a and 6b show a plan view and a diagonal view of an alternative embodiment of a resilient element.
Figure 6B:
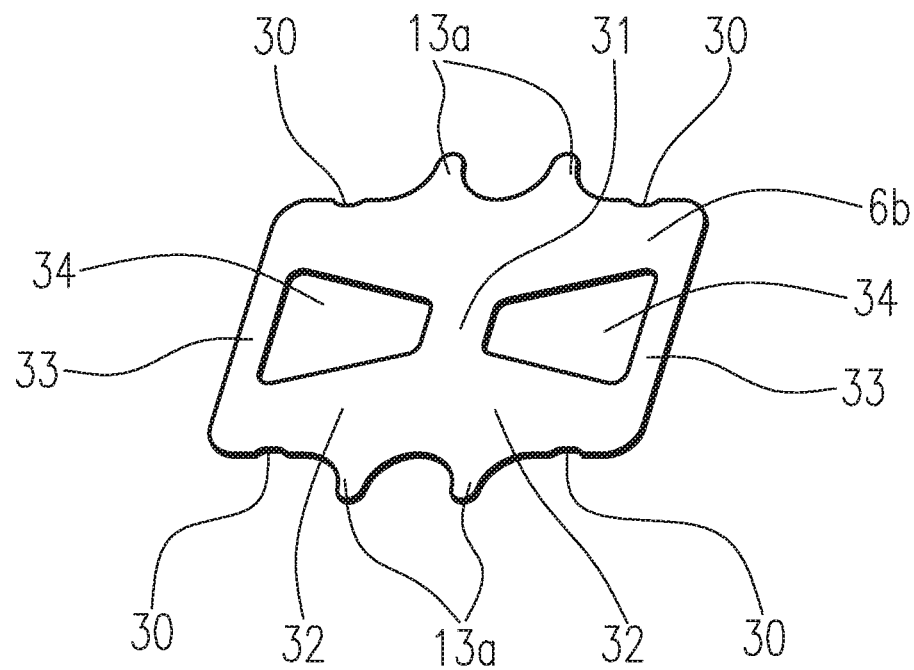

The FIGS. 6a and 6b each show a view of an embodiment of a resilient element 6b, which includes a near-axial central region 31 and two decentral regions 32 adjacent thereto, wherein the decentral regions 32 have recesses 34 formed symmetrical to the central region 31. Adjacent to each of the decentral regions 32 is an edge region 33, which has no recesses itself. The resilient element 6b is supported or borne at its edge regions 33 in the supports 9 of the rotor body 3. In the exemplary embodiment, the recesses 34 have a trapezoidal shape and flare out towards the edge regions 33.

Figure 7:
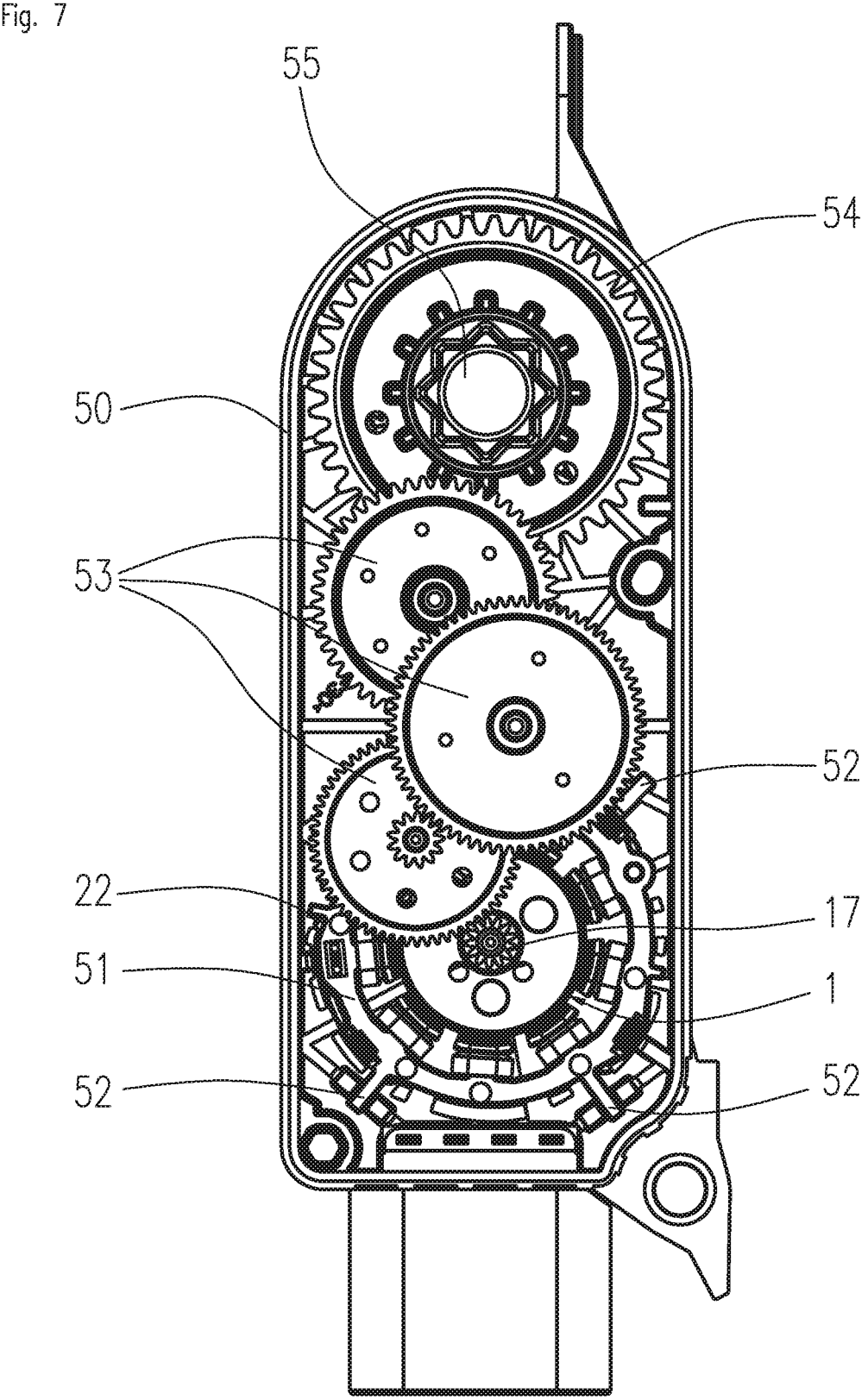
FIG. 7 shows a plan view of an actuating drive comprising a rotor of FIG. 2.
Figure 8:
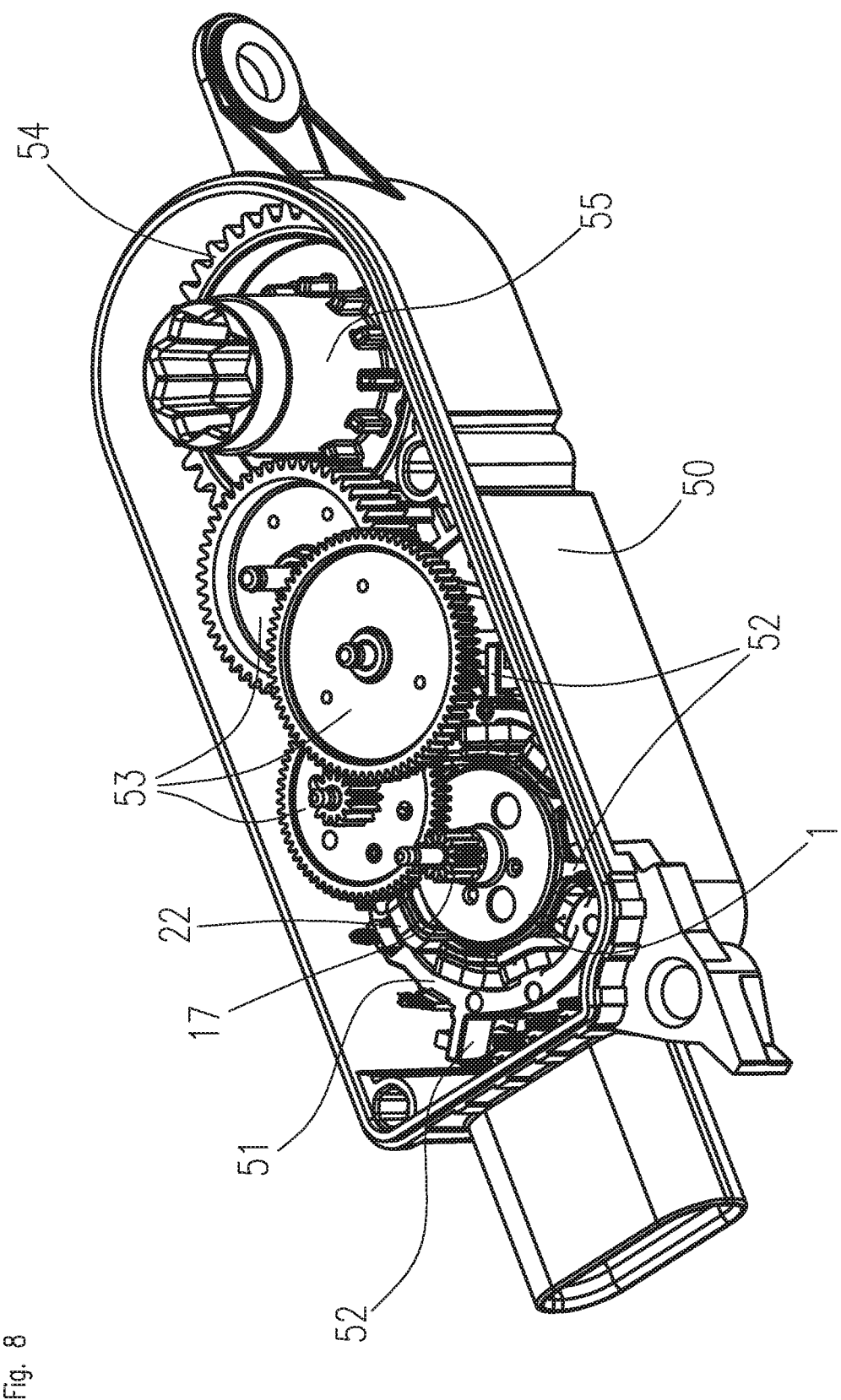
FIG. 8 shows a diagonal view of the rotor of FIG. 7.

FIGS. 7 and 8 show a plan view and a perspective view, respectively, of an actuating drive with a rotor 1 according to the invention. The rotor 1, the stator 22 and a reduction transmission are arranged in a housing 50, wherein a cover of the housing is not shown. Here, the rotor 1 is formed with three phase windings and comprises a slot insulation 51 above the stator body 3. At the slot insulation 51, attachment protrusions 52 are formed which are attached to corresponding protrusions of the housing. The bearing 17 formed on the rotor drives three intermediate gears 53 of the reduction transmission, which in turn drive an output gear 54. The output gear 54, in the present example, is integrally formed with a hollow shaft 55 to transmit a torque to a load. The intermediate gears 53 are formed as double gears.

The invention claimed is:

1. A rotor (1) for an electric motor, comprising a rotor magnet (la) and a rotor body (3) with a bearing (2) for the rotatable support on a fixed axle (10), the bearing (2) including a first bearing half-shell (4) and a second bearing half-shell (5), wherein at least the first bearing half-shell (4) is moveably arranged within the rotor body (3) with respect to the second bearing half-shell (5), wherein the first bearing half-shell (4) is supported against the rotor body (3) by a resilient element (6, 6a, 6b) tangentially arranged with respect to the axle (10), wherein the resilient element (6, 6a, 6b), has first and second side surfaces spaced apart along an axial direction of the axle (10) with at least one first protrusion (13a) extending in the axial direction from each of the first and second side surfaces, and the first bearing half-shell, on a side facing the resilient element (6, 6a, 6b), includes at least two axially spaced second protrusions (13b) each extending in a radial direction and cooperating with the first protrusions (13a) for aligning the resilient element (6, 6a, 6b).

2. The rotor (1) according to claim 1, wherein each of the first and second side surfaces of the resilient element (6, 6a, 6b) includes two first protrusions (13a) for aligning the resilient element (6).

3. The rotor (1) according to claim 1, wherein the resilient element (6, 6a, 6b) includes a near-axle central region (31) and two decentral regions (32) adjacent thereto, wherein the decentral regions (32) have recesses (34) symmetrically formed with respect to the central region.

4. The rotor (1) for an electric motor according to claim 1, wherein the resilient element (6b) includes a near-axle central region (31) and two decentral regions (32) adjacent thereto, wherein the decentral regions (32) have recesses (34) symmetrically formed with respect to the central region.

5. The rotor (1) according to claim 4, wherein the recesses (34) flare out in their extension along the decentral regions (32) starting from the central region (31).

6. The rotor (1) according to claim 4, wherein the resilient element (6) further comprises edge regions (33) adjacent to the decentral regions (32), wherein the edge regions (33) have no recesses and wherein the resilient element (6) is supported in the rotor body (3) at the edge regions (33).

7. The rotor (1) according to claim 1, wherein the resilient element (6, 6a, 6b) is a beam element and the first bearing half-shell (4) is arranged on a longitudinal side of the beam element.

8. The rotor (1) according to claim 1, wherein side walls of the first and second bearing half-shells (4, 5) in contact with the axle (10) are formed to be interlocking with the axle (10) to be supported.

9. The rotor (1) according to claim 1, wherein the rotor body (3), at an inner circumference of a recess for receiving the resilient element (6, 6a, 6b), includes a protrusion (21) extending in the axial direction, wherein the protrusion (21) is arranged opposite the resilient element (6, 6a, 6b) and limits its maximum bending.

10. The rotor (1) according to claim 9, wherein the second protrusions (13b) of the first bearing half-shell (4) cooperate with the protrusion (21) of the rotor body (3) to limit the maximum bending of the resilient element (6, 6a, 6b).

11. The rotor (1) according to claim 1, wherein the rotor body (3) includes cavities (15) defined by webs (20), and protrusions which contribute to a lower moment of inertia and help to avoid imbalance.

12. The rotor (1) according to claim 1, wherein the rotor body (3) includes hooks or protrusions (14), which in turn engage in pockets (16) formed in the rotor magnet (la).

13. The rotor (1) according to claim 1, wherein the rotor body (3), at its axial ends, includes a respective attachment region (12), wherein the attachment regions (12) have a larger circumference than an interposed retaining region (11), and wherein the rotor magnet (la) is arranged at the retaining region (11) and retained by the attachment regions (12).

14. The rotor (1) according to claim 13, wherein the rotor body (3) includes hooks or protrusions (14), the hooks or protrusions (14) of the rotor body (3) being arranged or formed at the attachment regions (12).

15. The rotor (1) according to claim 1, wherein the rotor body (3) includes at least two supports (9) for receiving the resilient element (6, 6a, 6b) and the resilient element (6, 6a, 6b) is supported within the rotor body (3) in a statically overdetermined manner.

16. The rotor (1) according to claim 15, wherein the supports (9) of the resilient element (6, 6a, 6b) are spaced apart from a plane defined by a rotor axle and an apex of the side wall of the first bearing half-shell (4).

17. The rotor (1) according to claim 1, wherein the resilient element (6, 6a, 6b), when it is excited by a rotary movement of the rotor body (3), is configured to form only higher-order eigenforms which result in a translatory displacement of the first bearing shell (4) in relation to the axle (10).

18. The rotor (1) according to claim 1, wherein the resilient element (6, 6a, 6b) consists of metal or plastic.

19. The rotor (1) according to claim 1, wherein the resilient element (6, 6a, 6b) is integrally formed with the first bearing shell (4).

20. The rotor (1) according to claim 1, wherein at least one of the first bearing half-shell (4) and the resilient element (6, 6a, 6b) consists of materials having a low specific weight.

21. The rotor (1) according to claim 15, wherein the distance along a normal from a connecting line extending between the supports (9) to the axle (10) is smaller than an extension of the resilient element (6, 6a, 6b) and/or the first bearing half-shell (4) along the normal.

22. An electric motor, comprising a rotor (1) according to claim 1.

23. A rotor (1) for an electric motor, comprising a rotor magnet (la) and a rotor body (3) with a bearing (2) for the rotatable support on a fixed axle (10), the bearing (2) including a first bearing half-shell (4) and a second bearing half-shell (5), wherein at least the first bearing half-shell (4)

is moveably arranged within the rotor body (3) with respect to the second bearing half-shell (5), wherein the first bearing half-shell (4) is supported against the rotor body (3) by a resilient element (6, 6a, 6b) tangentially arranged with respect to the axle (10), wherein the resilient element (6b) includes a near-axle central region (31) and two decentral regions (32) adjacent thereto, wherein the decentral regions (32) have recesses (34) symmetrically formed with respect to the central region.

24. The rotor (1) according to claim 23, wherein the recesses (34) flare out in their extension along the decentral regions (32) starting from the central region (31).

25. The rotor (1) according to claim 23, wherein the resilient element (6) further comprises edge regions (33) adjacent to the decentral regions (32), wherein the edge regions (33) have no recesses and wherein the resilient element (6) is supported in the rotor body (3) at the edge regions (33).

26. The rotor (1) according to claim 23, wherein the resilient element (6, 6a, 6b) is a beam element and the first bearing half-shell (4) is arranged on a longitudinal side of the beam element.

27. The rotor (1) according to claim 23, wherein side walls of the first and second bearing half-shells (4, 5) in contact with the axle (10) are formed to be interlocking with the axle (10) to be supported.

28. The rotor (1) according to claim 23, wherein the rotor body (3), at an inner circumference of a recess for receiving the resilient element (6, 6a, 6b), includes a protrusion (21) extending in an axial direction of the axle (10), wherein the protrusion (21) is arranged opposite the resilient element (6, 6a, 6b) and limits its maximum bending.

29. The rotor (1) according to claim 28, wherein the second protrusions (13b) of the first bearing half-shell (4) cooperate with the protrusion (21) of the rotor body (3) to limit the maximum bending of the resilient element (6, 6a, 6b).

30. The rotor (1) according to claim 23, wherein the rotor body (3) includes cavities (15) defined by webs (20), and protrusions which contribute to a lower moment of inertia and help to avoid imbalance.

31. The rotor (1) according to claim 23, wherein the rotor body (3) includes hooks or protrusions (14), which in turn engage in pockets (16) formed in the rotor magnet (la).

32. The rotor (1) according to claim 23, wherein the rotor body (3), at its axial ends, includes a respective attachment region (12), wherein the attachment regions (12) have a larger circumference than an interposed retaining region (11), and wherein the rotor magnet (la) is arranged at the retaining region (11) and retained by the attachment regions (12).

33. The rotor (1) according to claim 32, wherein the rotor body (3) includes hooks or protrusions (14), the hooks or protrusions (14) of the rotor body (3) being arranged or formed at the attachment regions (12).

34. The rotor (1) according to claim 23, wherein the rotor body (3) includes at least two supports (9) for receiving the resilient element (6, 6a, 6b) and the resilient element (6, 6a, 6b) is supported within the rotor body (3) in a statically overdetermined manner.

35. The rotor (1) according to claim 34, wherein the supports (9) of the resilient element (6, 6a, 6b) are spaced apart from a plane defined by a rotor axle and an apex of the side wall of the first bearing half-shell (4).

36. The rotor (1) according to claim 23, wherein the resilient element (6, 6a, 6b), when it is excited by a rotary movement of the rotor body (3), is configured to form only higher-order eigenforms which result in a translatory displacement of the first bearing shell (4) in relation to the axle (10).

37. The rotor (1) according to claim 23, wherein the resilient element (6, 6a, 6b) consists of metal or plastic.

38. The rotor (1) according to claim 23, wherein the resilient element (6, 6a, 6b) is integrally formed with the first bearing shell (4).

39. The rotor (1) according to claim 23, wherein at least one of the first bearing half-shell (4) and the resilient element (6, 6a, 6b) consists of materials having a low specific weight.

40. The rotor (1) according to claim 34, wherein the distance along a normal from a connecting line extending between the supports (9) to the axle (10) is smaller than an extension of the resilient element (6, 6a, 6b) and/or the first bearing half-shell (4) along the normal.

41. An electric motor, comprising a rotor (1) according to claim 23.

* * * * *